US011477141B2

(12) United States Patent
Gupta et al.

(10) Patent No.: US 11,477,141 B2
(45) Date of Patent: Oct. 18, 2022

(54) INTERACTIVE CHATBOT FOR MULTI-WAY COMMUNICATION

(71) Applicant: OLX Global B.V., Amsterdam (NL)

(72) Inventors: Ayushi Gupta, Noida (IN); Kashish Mehta, Haryana (IN); Shalab Vaishnav, East Delhi (IN); Shivali Wason, New Delhi (IN)

(73) Assignee: OLX GLOBAL B.V., Amsterdam (NL)

( * ) Notice: Subject to any disclaimer, the term of this patent is extended or adjusted under 35 U.S.C. 154(b) by 0 days.

(21) Appl. No.: 17/164,931

(22) Filed: Feb. 2, 2021

(65) Prior Publication Data

US 2022/0247699 A1 Aug. 4, 2022

(51) Int. Cl.
*H04L 51/02* (2022.01)
*G06N 20/00* (2019.01)
*H04L 51/046* (2022.01)

(52) U.S. Cl.
CPC ............ *H04L 51/02* (2013.01); *G06N 20/00* (2019.01); *H04L 51/046* (2013.01)

(58) Field of Classification Search
CPC ........ H04L 51/02; H04L 51/046; G06N 20/00
See application file for complete search history.

(56) References Cited

U.S. PATENT DOCUMENTS

| 2017/0180276 | A1* | 6/2017 | Gershony | ............... H04L 51/02 |
| 2018/0181558 | A1* | 6/2018 | Emery | ............... H04M 3/4936 |
| 2018/0196796 | A1* | 7/2018 | Wu | ........................ G06F 40/289 |
| 2018/0349754 | A1* | 12/2018 | Kumar | ................... G06N 3/006 |

* cited by examiner

*Primary Examiner* — Soe Hlaing
(74) *Attorney, Agent, or Firm* — Buckley, Maschoff & Talwalkar LLC (57) ABSTRACT

Provided are systems and methods for an interactive bot for multi-way communication. In one example, the method may include displaying a user interface including a communication session between a first user, a second user, and a chatbot, detecting, via a user interface, a request submitted by the first user to the second user via the user interface, determining, via a machine learning model, a response to the request based on a type of object associated with the communication session, and determining a confidence value of the determined response, and outputting a message from the chatbot via the user interface which includes the determined response, in response to the confidence value of the determined response being above a predetermined threshold value.

21 Claims, 11 Drawing Sheets

INTERACTIVE CHATBOT FOR MULTI-WAY COMMUNICATION

BACKGROUND

An online marketplace enables buyers to purchase items from sellers through a website, a mobile application, a third party, or the like. Users may post ads and other users may respond with interest. For example, a potential buyer may reach out to a seller via text messages or the like. However, in many situations, the users are not familiar with each other, the object (product) that is the subject of the purchase, the type of questions to ask, a fair price for the object they are attempting to purchase, and the like. These attributes may cause a lack of trust and also cause a delay in coming to an agreement. Also, some users are not "serious" about the deal. These type of users can bog down other users who are making a good faith attempt to negotiate.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments that is shown but is to be accorded the widest scope consistent with the principles and features disclosed herein.

A bot (also referred to as a chatbot) is a software program that runs tasks (e.g., scripts) over the Internet. Typically, a bot performs tasks that are simple and repetitive. Some bots are capable of communicating via instant messaging. For example, a bot may communicate with a user via a back and forth exchange between the user and the bot. For example, the bot may receive a request from a user, match the request to a predetermined response, and output the matched response to the user. This type of bot interaction can be used to replace a human for simple data collection and information providing functions. However, bot interaction is typically between a single user and the bot. That is, a bot is typically limited to a communication sequence between a single user.

The example embodiments introduce a new type of bot that can interact with multiple users at the same time, rather than just a single user. The bot may be referred to herein as a multi-way interactive bot, a chatbot, or just simply a bot. In particular, the interactive multi-way bot may interact with users within a chat window that may be part of a larger chat application (also referred to as a messaging application) that may be included in an online marketplace or other application. Examples of the types of messages that may be transmitted via the chat application include short message service (SMS), multimedia messaging service (MMS), and the like. As one example, the multi-way interactive bot may interact with a buyer (or multiple buyers) and a seller during the negotiation of the sale of an object via an online marketplace. However, it should be appreciated that the multi-way interactive bot may be used in other types of applications, for example, call centers, help desks, social media platforms, and the like.

Some of the benefits of the multi-way interactive bot include the ability to learn how a user will respond in certain situations (e.g., in response to particular questions) and transmit a response on the user's behalf. In the example of the online marketplace, a potential buyer may ask a seller a question about the object (e.g., product, etc.) being offered for sale by the seller. Here, the bot software may intercept/detect the question and predict a response of the buyer. In this case, the bot software may output a response on the buyer's behalf. In some embodiments, the bot software may be embedded within or communicate with one or more machine learning models that can learn from the conversations of users on the chat application. In some embodiments, the machine learning models can learn responses of users over time.

When generating the predicted response, the bot software may also determine a confidence of the predicted response. If the confidence value is high (e.g., above an upper threshold value), then the bot may automatically respond and output the predicted response via the message window which includes multiple users. Here, the response may be identified as being generated by a bot (e.g., by a bot avatar, icon, text value, etc.). As another example, if the confidence value is less than the upper threshold, but above a lower threshold, the bot software may have a general idea of how to respond but may not be confident enough to automatically output the response in the chat window. In this case, the bot software may suggest the predicted response to the buyer. That is, the bot software may output the suggested response to only the buyer, not the seller, or vice versa. This enables the user to receive the suggested response and make a decision whether to user the predicted response or use a manual response. Meanwhile, if the bot software has little confidence in the predicted response (e.g., below the lower threshold value), the bot may not respond at all and allow the user to respond.

In addition to a response, the bot software may also predict questions for the users to ask (e.g., the buyer or the seller, etc.). Furthermore, the bot software may output suggestions to the users to provide assurances. For example, the bot software may learn what is an average price based on other sales and conversations occurring within the chat application of the online marketplace. Here, the bot software may detect when a purchase offer has been submitted by a buyer and identify the purchase offer as good, bad, average, etc. The machine learning models used by the bot software may be programmed to facilitate the closure of a deal between the buyer and the seller. That is, the bot software may help facilitate the closing of an agreement between a buyer and a seller. The machine learning models may be trained to provide answers and suggest responses that are directed towards the sale of an item.

In some embodiments, the bot software may simultaneously post responses inside the chat windows of all users participating in the conversation. As another example, the bot software may selectively post data, suggestions, etc., withing the chat window of only one user or less than all users of the multi-way chat conversation. The bot software is also capable of identifying when a question has been asked, which triggers the bot software to perform the predicting of the response.

Figure 1:
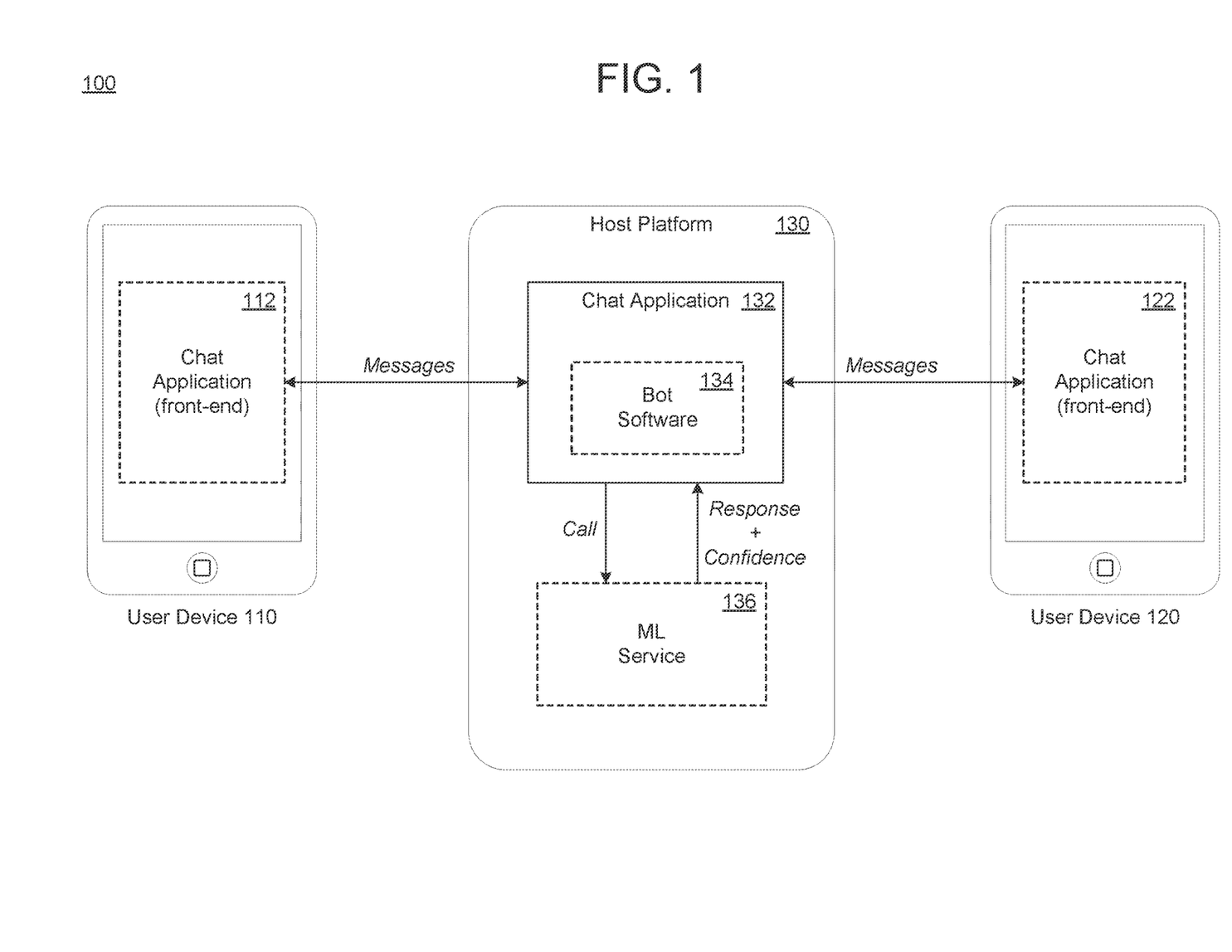
FIG. 1 is a diagram illustrating a communication environment of an interactive multi-way bot in accordance with an example embodiment.

FIG. 1 illustrates a communication environment 100 of an interactive multi-way bot software 134 in accordance with an example embodiment. Referring to FIG. 1, a chat application 132 hosted by a host platform 130 may output and manage a chat window which is used by a first user (user device 110) and a second user (user device 120) to communicate with each other via messages, for example, text messages, instant messages, short-message-service (SMS) messages, multimedia messaging service (MMS) messages, and the like. The chat application 132 may be a mobile application which includes a back-end 132 hosted by the host platform 130 and a front end 112 and 122 installed on the user devices 110 and 120, respectively. As another example, the chat application may be a web application. The user devices 110 and 120 may communicate with the host platform 130 via the Internet, a private network, or the like.

In the example of FIG. 1, a bot software 134 may be integrated within the chat application 132 or a standalone application running on the host platform. According to various embodiments, the bot software 134 may interact with multiple users at the same time within a single message window. The bot software 134 may communicate with a machine learning (ML) service 136 for generating predicted responses and questions. As another example, the ML service 136 may be integrated with the bot software 134. The ML service 136 may include one or more machine learning models which are trained based on chat conversations between users of the chat application 132. Here, the machine learning models may be trained based on all users, specific users, or the like. In some embodiments, the machine learning models may be trained based on chat conversations of different users than the users of user devices 110 and 120.

According to various embodiments, the user devices 110 and 120 may exchange messages via a message window (not shown) of the chat application 132. In addition to the users, the chat application 132 may also have a third entity (a bot output by the bot software 134) that participates in the conversation via the message window. In this example, a user of the user device 110 may submit or otherwise input a message directed to a user of the second device 120. For example, the message may be associated with an object being sold. In response, the chat application 132 may detect the message input from the user device 110 and call the ML service 136. The call may include an application programming interface (API) call, or the like. Here, the chat application may pass text content from the message to the ML service 136.

In response, the ML service 136 may determine whether the message includes a question therein. For example, a machine learning model of the ML service 136 may predict whether the text content within the message includes a question using a machine learning algorithm trained to identify questions. The machine learning model may identify indicators (words, phrases, combination of words, etc.) that are indicative of a question. In addition to determining whether the message includes a question, the machine learning model may determine a confidence value that represents how confident the machine learning model is that the message includes a question.

If the machine learning model identifies the message as including a question, the ML service 136 predicts a response to the question. For example, the machine learning model (or another machine learning model of the ML service 136) may predict a response to the question. In some embodiments, the same machine learning model may perform both predictions. As another example, a first machine learning model may predict whether a question is present in the message, and a second machine learning model may predict a response to the question. In this example, the first machine learning model may trigger the second machine learning model to predict a response to the question. Here, the machine learning models may work as a chain of models in which an output from a first machine learning model of the ML service 136 triggers execution of a second machine learning model of the ML service 136.

As an example, the predicted response may be output from a machine learning algorithm that receives the text content of the question, data of the object, and the like, as inputs. For example, the data of the object may be text descriptions of the object from a web page, a mobile app page, or the like.

The chat application 132 may receive the predicted response and the confidence value and determine whether or not to output the predicted response on behalf of the user of the second device 120. For example, the chat application 132 may store an upper threshold value and a lower threshold value. If the confidence value received from the ML service 136 is greater than the upper threshold value, the bot software 134 may output the predicted response to the message window. As another example, if the confidence value is less than the upper threshold but greater than the lower threshold, the bot software 134 may output a suggestion to an instance of the message window displayed on the second device 120, but not the first device 110. In other words, the bot software 134 may output a suggestion including the predicted response (or a predetermined number of predicted responses) to the instance of the message window on the second device 120, while preventing or otherwise hiding the suggested responses from an instance of the message window on the first device 110. As another example, if the confidence value is below the lower threshold, the bot software 134 may refrain from outputting anything.

Figure 2A:
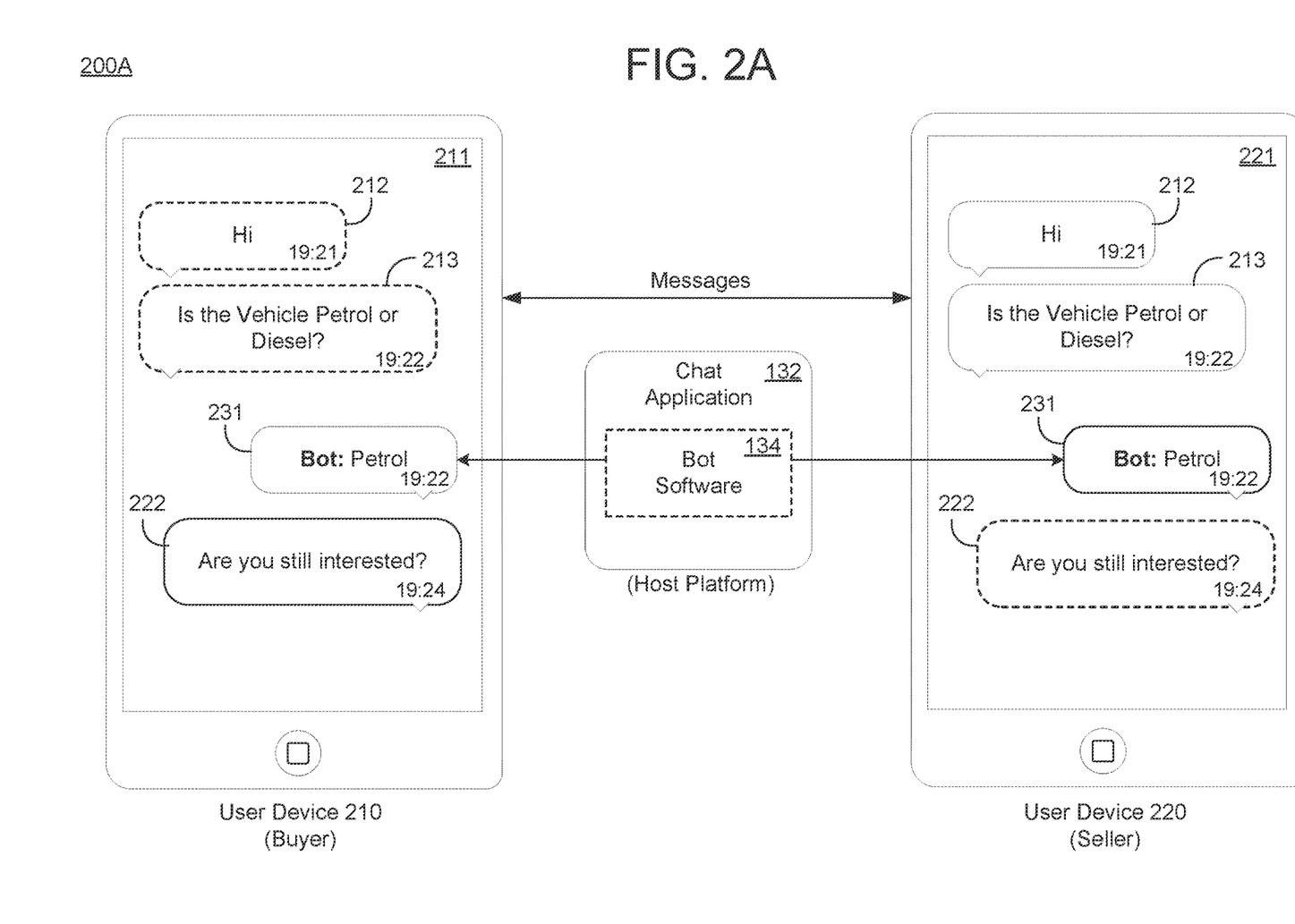
FIGS. 2A-2C are diagrams illustrating communication sequences between multiple users and a bot in accordance with example embodiments.
Figure 2B:
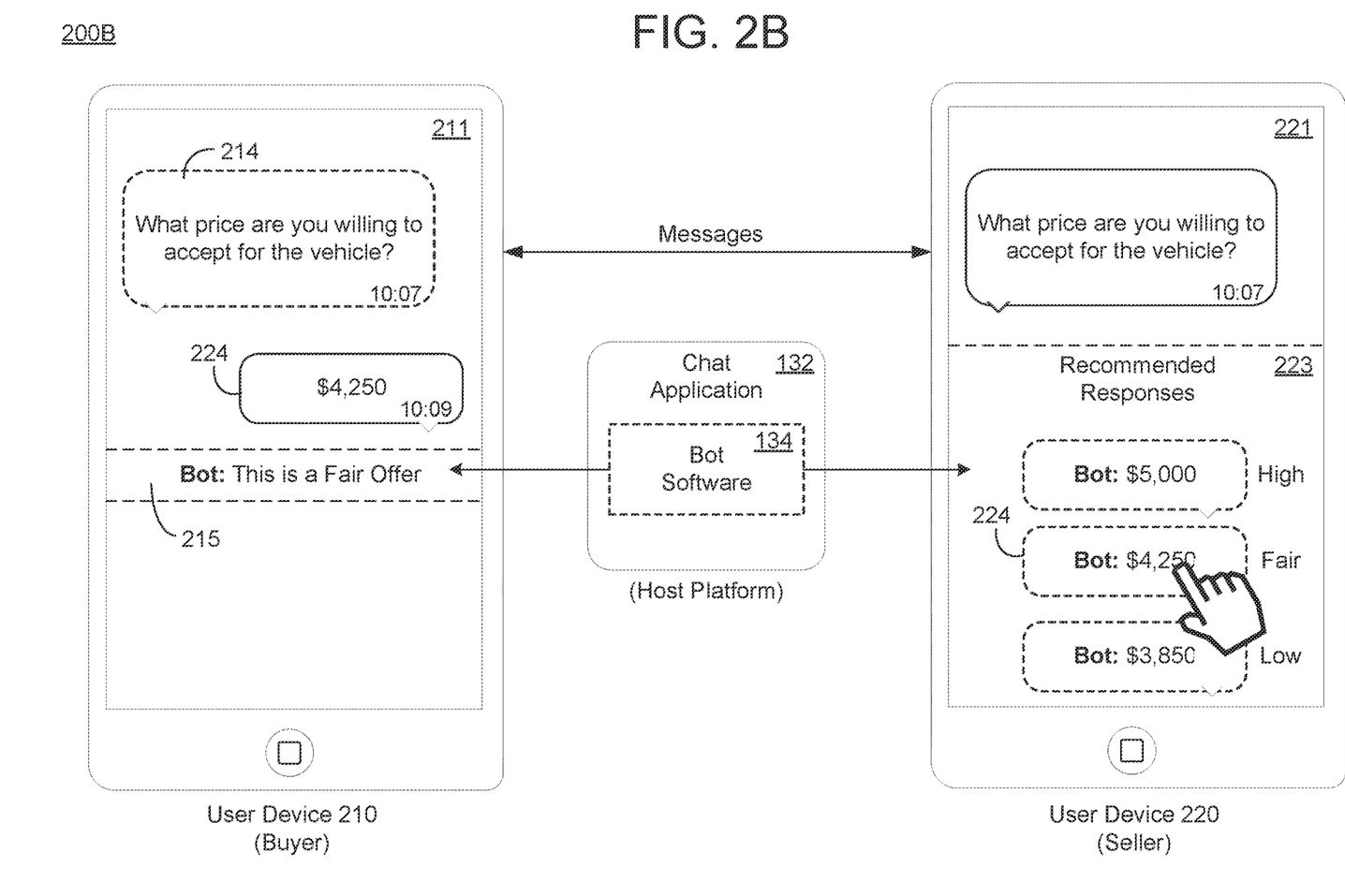
Figure 2C:
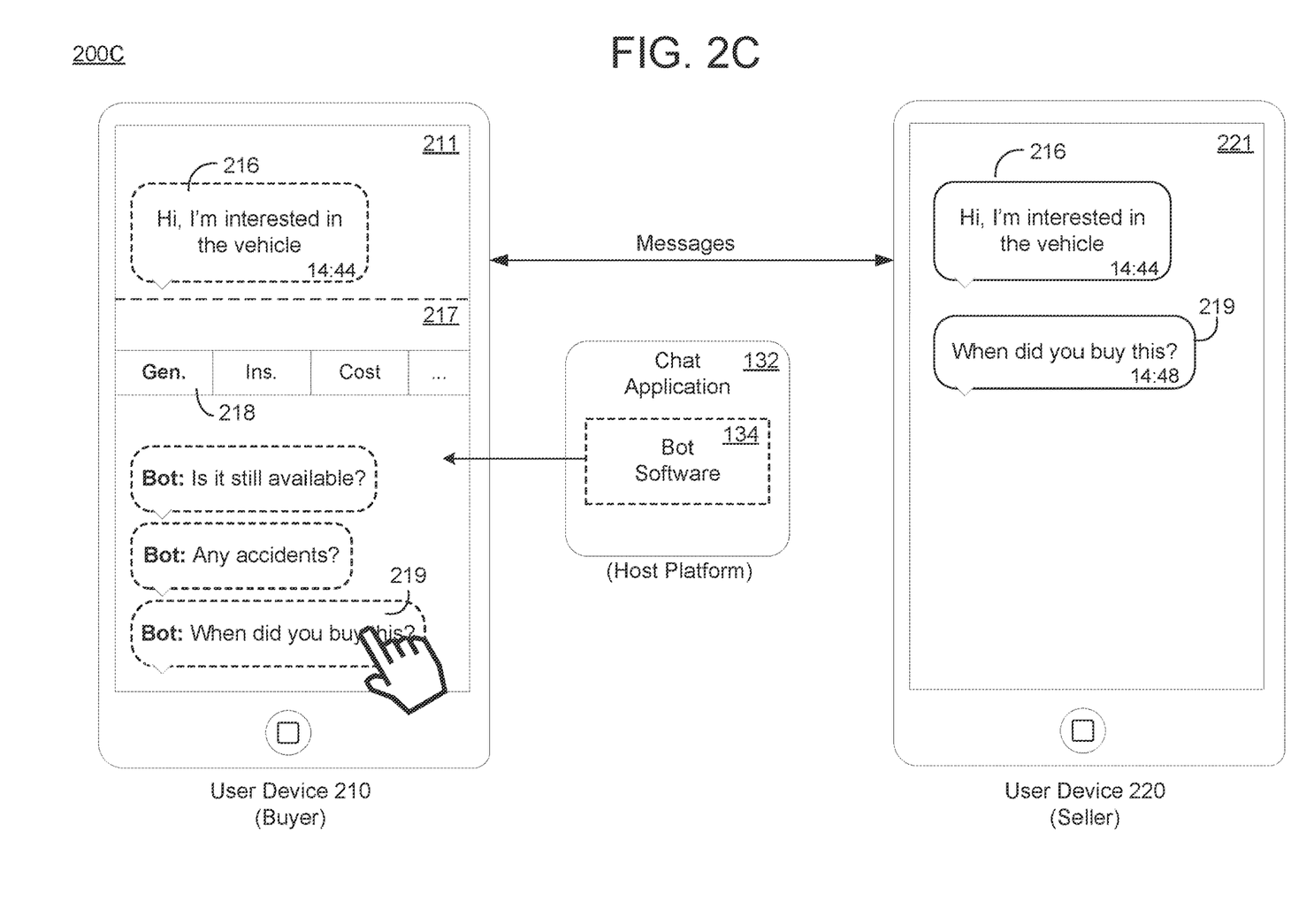

FIGS. 2A-2C illustrate communication sequences between multiple users and a bot in accordance with example embodiments. In addition to predicting a response, the bot software may also predict a confidence value associated with the predicted response. The confidence value may be used to determine whether to automatically output the predicted response on behalf of a user, whether to suggest the response to one of the users, or whether to ignore the predicted response and allow the user to manually answer.

Referring to FIG. 2A, a process 200A of an automated bot response is shown. In the example of FIG. 2A, two users (via user devices 210 and 220) are communicating via a chat application 132. Here, a first user inputs/submits messages 212 and 213 via a message window 211 on a user device 210. The messages may include unstructured text, alphanumeric content, and the like. The messages 212 and 213 are delivered to a message window 221 of a user device 220 of the second user via the chat application 132. As the messages pass through the chat application 132, the chat application 132 may detect the existence of the messages and identify whether the messages include a question, for example, using one or more machine learning models. In this example, the chat application 132 does not detect a question in message 212, however, the chat application 132 does identify a question within the unstructured text content of message 213.

Figure 3A:
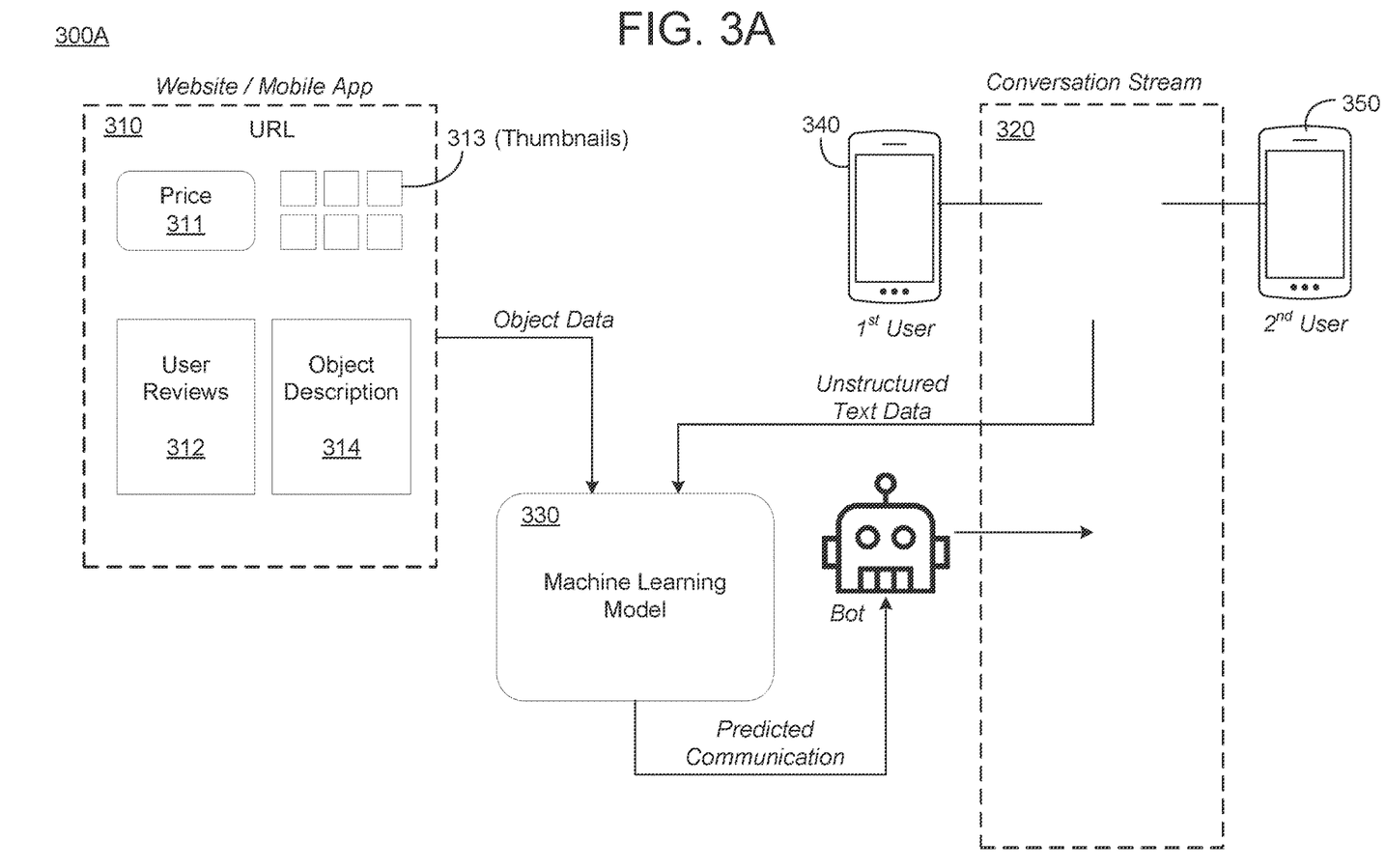
FIG. 3A is a diagram illustrating a process of a machine learning model predicting a bot communication in accordance with an example embodiment.
Figure 3B:
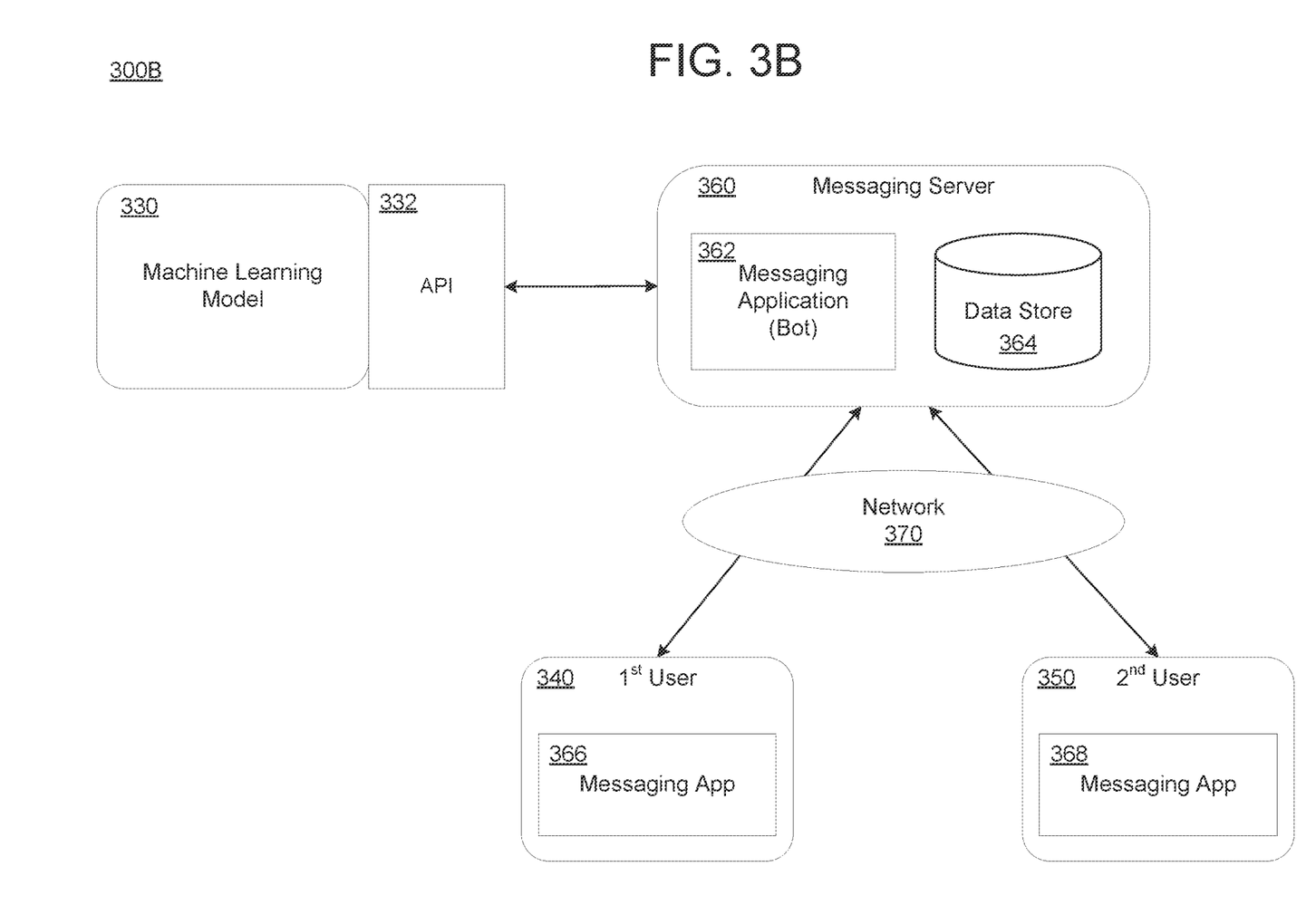
FIG. 3B is a diagram illustrating a process of transmitting the predicted communications via a messaging application in accordance with an example embodiment.

In response to detecting the question, the chat application 132 may trigger a machine learning model (e.g., such as shown in FIG. 3A and FIG. 3B) to predict a response to the question. In this case, the machine learning model predicts a response with great confidence. Accordingly, the bot software 134 with the chat application 132 may automatically output the predicted response in the form of a message 231 which is displayed on both message windows 211 and 221 of user devices 210 and 220, respectively. Thus, the bot software 134 is able to interact with the first user on behalf of the second user and step into the shoes of the second user.

The bot software 134 may output the response message 231 in near real-time thus providing the users with immediate responses and preventing the user of the user device 220 from needing to respond. In this example, the user of user device 220 also posts an additional message 222 which the chat application 132 detects, but is not confident in the answer. Therefore, the bot software 134 does not respond and waits for the user of user device 210 to respond.

Referring to FIG. 2B, a process 200B of a bot software 134 providing a recommend response to a user of user device 220 is shown. In this example, the first user enters a question 214 via the message window 211 which is detected by the chat application 132. Here, the chat application 132 identifies a top number (e.g., top 3, etc.) of predicted responses and outputs the recommended responses onto an area 223 of the message window 221 of the user device 220, but not on the message window 211 of the user device 210. That is, the bot software 134 may only output the recommended responses to an instance of the message window 221 of the user who is to select the recommended response. In this case, the recommended responses are predicted by the machine learning model, but the machine learning model lacks confidence about the responses. For example, the confidence value of the recommended responses may each be below an upper threshold value, but above a lower threshold value.

The bot software 134 may also output context associated with the recommended response (e.g., high, fair, low, etc.) to the area 223 of the message window 221. The context may be additional details of the proposed responses such as a fairness of the proposed offer with respect to similar objects that have been purchased through the chat application 132, or the like.

In this example, the user selects the recommend response 224 and the chat application 132 delivers the recommended response 224 as a message of the second user to the first user via the message window 211 of the user device 210. Although not shown in FIG. 2B, the chat application may close the recommended response area 223 and display the message 224 on the message window 221 of the user device 220 to match the display on the message window 211 of the user device 210. In addition, the bot software 134 may also provide information about the response 224 to the first user via the message window 211. Here, the bot software provides context 215 that identifies the proposed sale price as a fair price.

As another example, if the machine learning model is unable to arrive at a confidence value above a lower threshold, the bot software 134 may not output a predicted response as any of an automated response or a recommended response. Instead, the bot software 134 may wait for the user to respond manually.

Referring to FIG. 2C, a process 200C of a bot software 134 providing recommend questions to a user of user device 210 is shown. Here, the user of the user device 210 posts an initial message 216 indicating interest in an object (vehicle) being offered for sale by a user of the user device 220. The chat application 132 may execute the one or more machine learning models to predict questions that are available in this situation. Here, the recommended questions are output by the bot software 134 on an area 218 of the message window 211 of the user device 210, but not the user device 220. Instead, the chat application 132 hides the recommended questions from the second user device.

The questions may be arranged by categories. In this example, recommended questions are from a category 218 (general questions) which may be shown by default. The user may select other categories and receive a list of the top most questions for that category. The categories and the questions will be different depending on the object that is for sale. For example, recommended questions for a vehicle (e.g., any accidents, etc.) may be different from recommended questions for a mobile phone (e.g., what is the operating system, etc.) The questions and the categories may be dynamically selected by the bot software based on predictions by the machine learning model based on the current conversation content, the user, the object, and the like.

In this example, the user selects question 219 via the area 217 of the message window 211, and the chat application 132 delivers the selected question 219 to the message window 221 of the user device 220. In this example, the bot software 134 may recommend questions to a user that a user may be unaware of or that may help the user obtain valuable information about the object being offered for sale. These questions may be predicted by the machine learning model based on questions asked by other users of the same object.

FIG. 3A illustrates a process 300A of a machine learning model 330 predicting a bot communication in accordance with an example embodiment. For example, the bot communication may be a question or a response to a question. Referring to FIG. 3A, the machine learning model 330 may receive data about the object that is being sold, for example, for an external source such as a web listing 310 which includes details of the object such as a price 311, user reviews 312, images 313, a description 313 of the object such as details, specifications, size, weight, fuel type, color, owner information, and the like. Here, the object data may be input into the machine learning model 330.

In addition, text content from a conversation stream 320 (e.g., a conversation window of a chat application, etc.) between multiple users may be input into the machine learning model 330. For example, the input from the conversation stream 320 may be limited to a particular question or answer provided by one of the users among the multiple users interacting via the conversation stream 320 which may be used to predict a communication of the bot such as a question or a response. As another example, the input from the conversation stream 320 may include content posted by multiple users that may be used by the machine learning model 330 to make a prediction about a bot communication such as a question or a response.

That is, the machine learning model 330 may receive input data from multiple sources including a web resource (e.g., URL) which includes data of the object that is the subject of the conversation in the conversation stream 320, and unstructured text content from messages posted in the conversation stream 320, and determine a bot communication to be output by the bot into the conversation stream 320. The output communication by the bot may be in the form of a message which includes unstructured text. The bot may output the communication to message windows (UIs) of all users (e.g., clients 340 and 350) to the conversation stream 320 or selectively output to a subset of users (or just one user) of the conversation stream 320.

FIG. 3B illustrates a process 300B of transmitting predicted communications via a messaging application in accordance with an example embodiment. Referring to FIG. 3B, a messaging application 362 (back-end) is hosted by a messaging server 360. Meanwhile, the machine learning model 330 may be hosted on the same messaging server 360 or a different system that is external to the messaging server 360. The messaging server 360 may call the machine learning model 330 via an application programming interface (API) 332 of the machine learning model 330. For example, a node.js backend service running on the messaging server 360 may call the machine learning model 330 via the API 332. The API call may include content of a chat/messaging conversation between the user devices 340 and 350. For example, the messaging server 360 may capture communication content (e.g., text content from messages posted via the messaging application 362 within a chat conversation between the user devices 340 and 350, and dynamically forward the message content to the machine learning model 330 via the API call along with a request for a predicted response/suggestion.

Each of the user devices 340 and 350 may include a respective front-end of the messaging application 366 and 368, respectively, which are installed therein. The user devices 340 and 350 may interact with each other and the messaging application 362 of the messaging server 360 via the messaging applications 366 and 368. The communications may be transmitted via a network 370 such as the internet. When a predicted response is determined by the machine learning model 330, it may be passed back to the messaging server 360. The messaging application 362 on the messaging server 360 may output the predicted response via a chat bot within a messaging window of the messaging applications 366 and 368 running on the user devices 340 and 350.

Figure 3C:
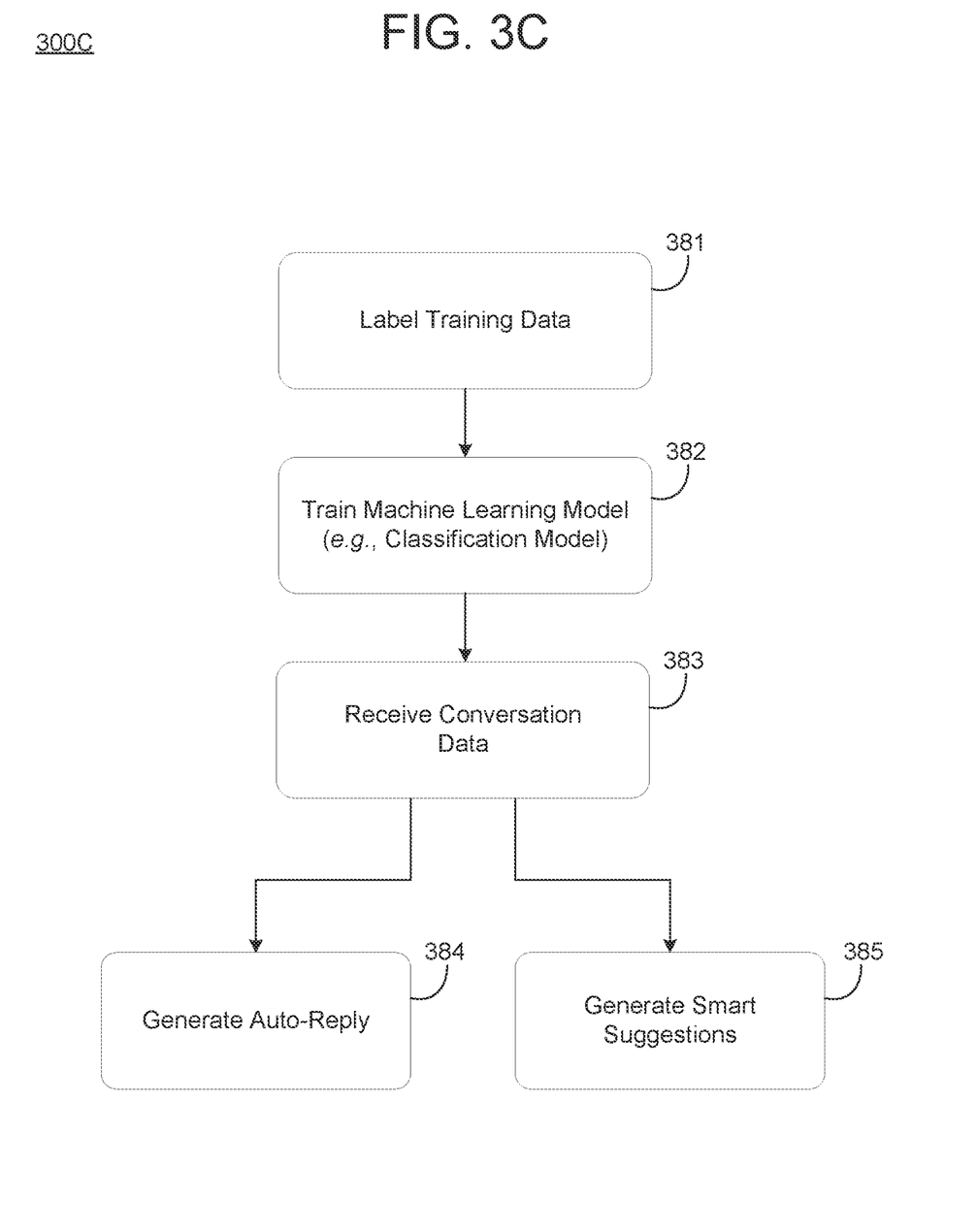
FIG. 3C is a diagram illustrating a process of training and implementing the machine learning model in accordance with an example embodiment.

FIG. 3C illustrates a process 300C of training and implementing the machine learning model 330 in accordance with an example embodiment. The lifecycle of the machine learning model 330 may include training, implementing, and re-training. As one example, the machine learning model 330 may be an intent classification model, but embodiments are not limited thereto. Referring to FIG. 3C, in 381, training data (e.g., previous conversations and messages) may be collected and labeled. Labeled training data may include questions asked by a buyer and answers given by a seller in response. As another example, labeled training data may include questions asked by a seller when attempting to sell an item. The labeled training data may be specific for a particular category of product (e.g., automobiles) or it may be generic in that it applies to all products.

In 382, the machine learning model 330 is executed on the labeled training data to train the machine learning model 330. This process may be iteratively performed many times, and each iteration the machine learning model 330 may capture more knowledge thereby increasing an accuracy of its predictions. Here, the host platform may convert the words from the training data into vectors that can be processed by the machine learning model 330. In some embodiments, the host platform may refine the training data by removing/filtering out various unhelpful words or stop words.

Once the model is trained, in 383 the model can be activated on the host platform and can receive message content from a live messaging session between two or more users. Here, the trained model can predict responses. For example, in 384 the machine learning model can predict an auto-reply that is output without waiting for a user to respond. As another example, in 385, a suggested response may be output on a screen of one user but not both users, providing a suggested response(s) to the user for selection. In some embodiments, content from the messaging session can also be used to further refine/train the model.

Figure 4A:
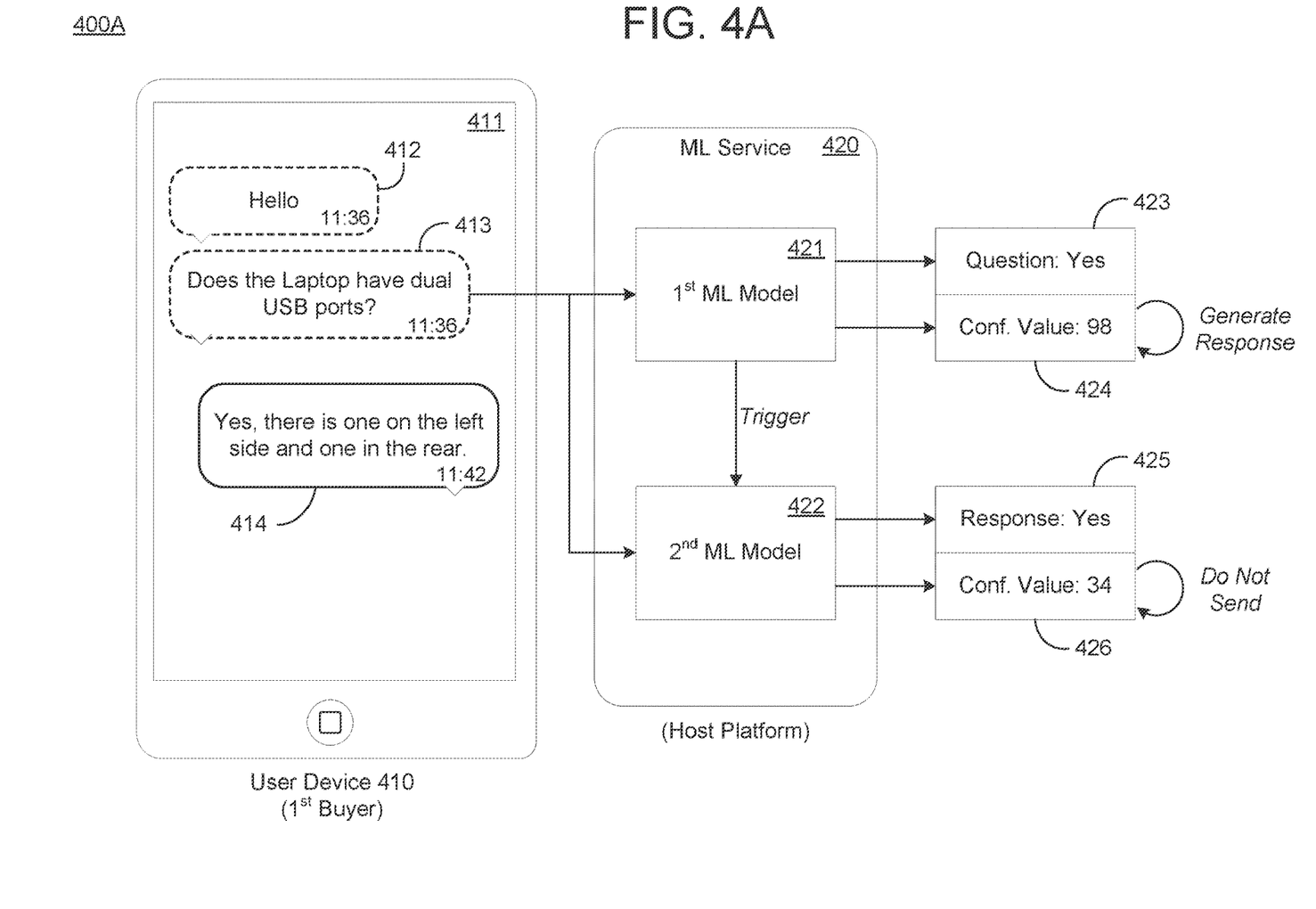
FIGS. 4A-4B are diagrams illustrating a continuous learning process of a machine learning model in accordance with example embodiments.
Figure 4B:
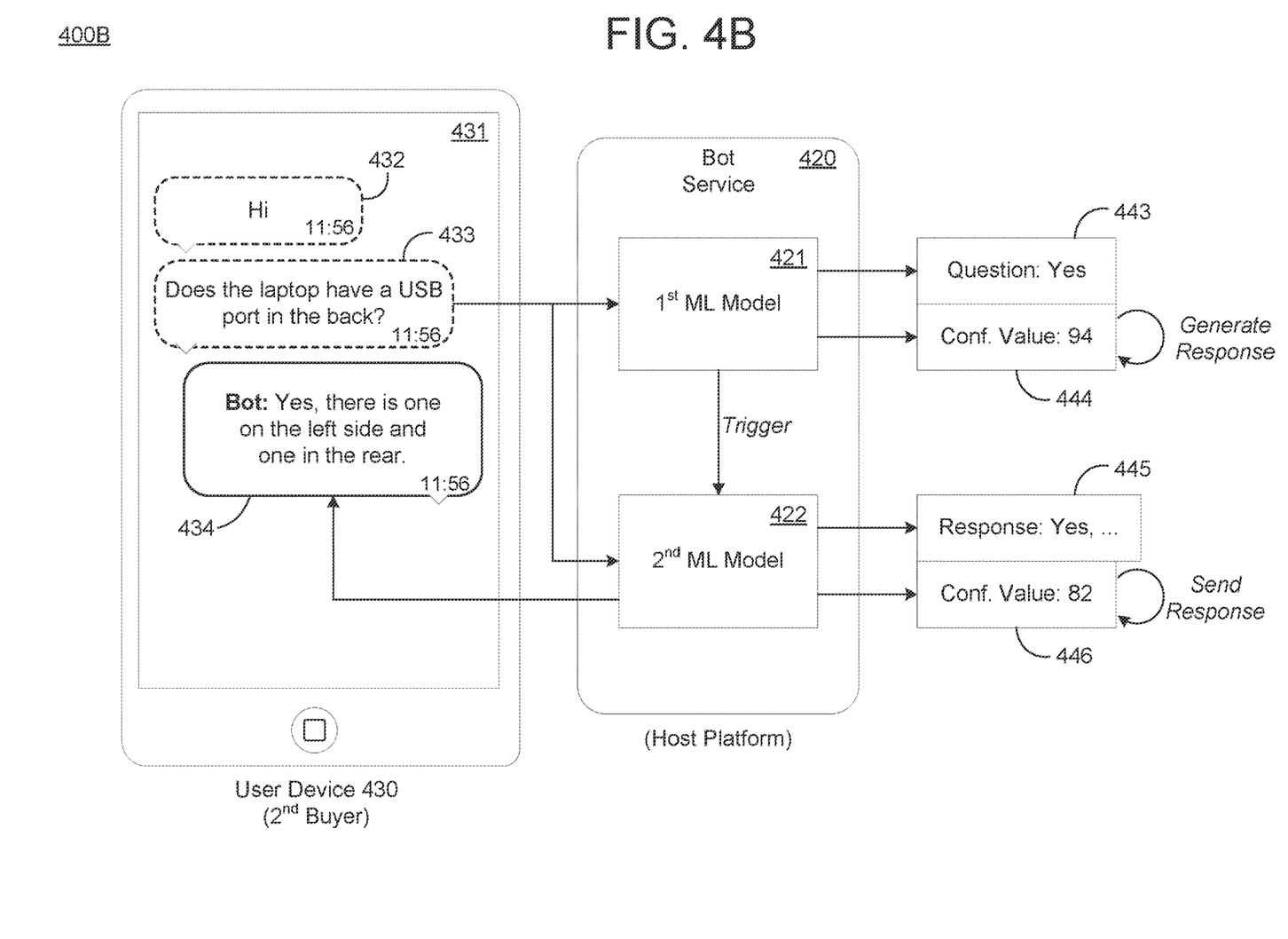

FIGS. 4A-4B illustrate a continuous learning process of a machine learning model in accordance with example embodiments. FIG. 4A illustrates a process 400A of a machine learning service 420 predicting a response and determining not to send the predicted response. In this example, the ML service 420 may be embedded within a chat application, a bot software, or a standalone service that is called by either the chat application and/or the bot software. Referring to FIG. 4A, a user (e.g., a first buyer) enters a message 412 and a message 413 via a message window 411 (user interface) of a user device 410. The messages 412 and 413 are delivered to a second user (a seller). The ML service 420 may evaluate each message 412 and 413 and determine whether to respond on behalf of the seller. In this example, the ML service 420 includes a first ML model 421 for identifying whether or not a question exists within unstructured message content, and a second ML model 422 for predicting a response to an identified question.

The content of the first message 412 does not include a question, and is ignored by the ML service 420. However, the second message 413 is identified as including a question (i.e., output "yes" in 423) by the first ML model 421. In some embodiments, the first ML model 421 may also output a confidence value 424 indicating how confident the first ML model 421 is that the question exists. It should be appreciated that the confidence score is not required and is just one example. In this case, the first ML model 421 identifies the question, and a high enough confidence (e.g., above a predetermined threshold), and outputs a trigger to execute the second ML model 422. In this case, the output of the first ML model 421 being input to the second ML model 422 triggers execution of the second ML model 422 based on the text content of the second message 413.

The second ML model 422 receives the unstructured text content of the question, and possibly other data of an object being sold such as from a web page, etc., and determines whether a predicted response is available on behalf of the seller. In this example, the output of the second ML model 422 includes a yes determination 425 as a predicted response to the question 413 and a confidence value 426 of the predicted response 425. Here, the confidence value is below a predetermined lower threshold (e.g., of 50, etc.). Because of this, the ML service 420 determines not to output the proposed response 425 via the bot. Instead, the ML service 420 waits for the seller to respond as shown in message 414.

In this example, the second ML model 422 may be retrained based on the answer 414 from the seller. Thus, the second ML model 422 may continue to learn from questions and answers that are input by either user during the course of a conversation. For example, the host platform may add the message content from message 414 to a training data set and retrain the second ML model 422 based on the updated training data set. The second ML model 422 may apply the newly gathered knowledge to the current chat, a different chat between one or more of the users and a different user, and to chats involving completely different users.

FIG. 4B illustrates a process 400B of the second ML model 422 applying the newly gathered knowledge learned in the process 400A of FIG. 4A, to a different conversation between the same seller and a different buyer (user device 430). In this example, the second buyer inputs messages 432 and 433 via a message window 431 displayed on the user device 430 of the second buyer. Here, the first message 432 is ignored since it does not include a question. However, the second message 433 is identified as comprising a question by the first ML model 421. Accordingly, the first ML model 421 outputs a yes determination in 443 and a confidence value 444 of the determination. Because of the yes determination 443 (and possibly the confidence value 444), the first ML model 421 triggers execution of the second ML model 422.

In this example, the second ML model 422 receives the unstructured text content of the question 433, and possibly other data about the object from external sources, and predicts a response 445 to the question 433. In addition, the second ML model 422 determines a confidence value 446 of the predicted response 445. In this case, the confidence value is higher than a predetermined upper threshold (e.g., 80, etc.). Accordingly, the ML service 420 triggers the chat application/bot software to output the predicted response 445 as a message 434. In this example, the question 433 is very similar to the question 413 shown in FIG. 4A, however, in this case, the second ML model 422 has acquired more knowledge about the seller's answer and can now confidently predict an answer by the seller.

Figure 5:
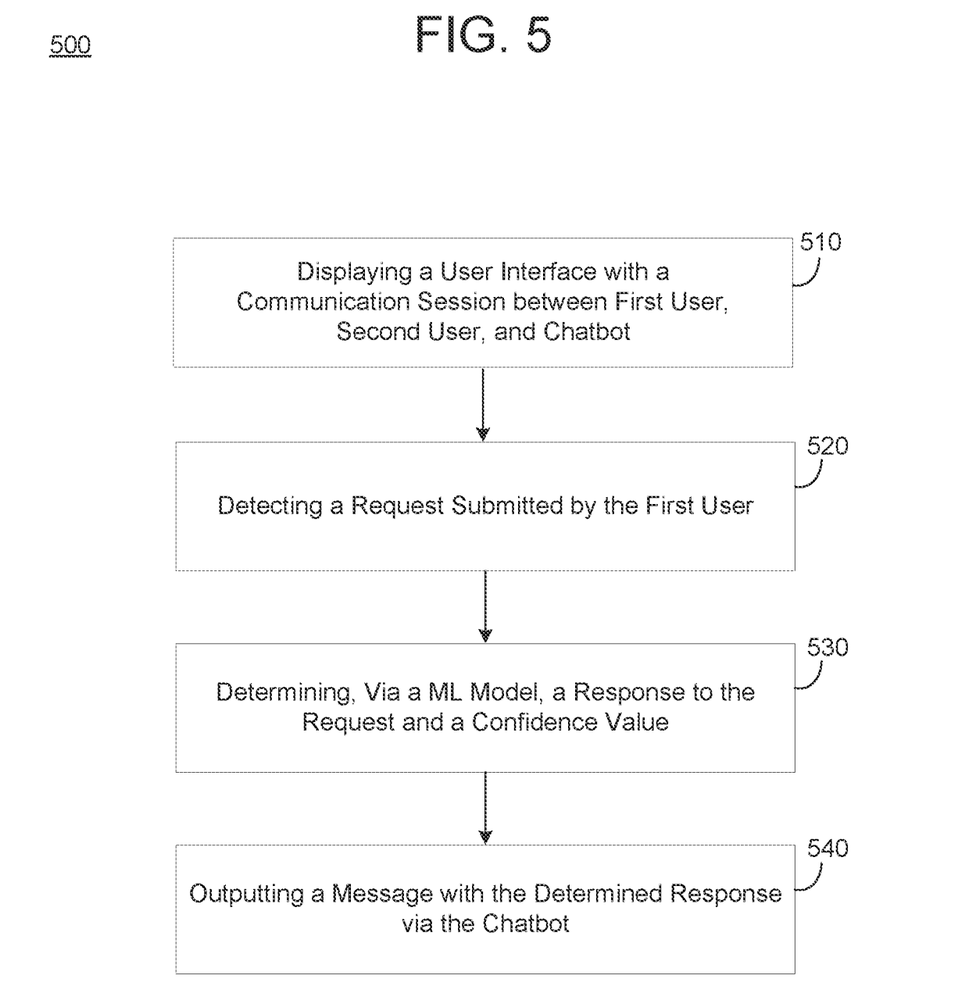
FIG. 5 is a diagram illustrating a method of providing a bot response on behalf of a user in a multi-way chat in accordance with an example embodiment.

FIG. 5 illustrates a method 500 of providing a bot response on behalf of a user in a multi-way chat in accordance with an example embodiment. For example, the method 500 may be performed by a web server, a host platform, a cloud platform, a database, and/or the like. In some embodiments, the method 500 may be performed by a host platform of a mobile application or a website, however embodiments are not limited thereto.

Referring to FIG. 5, in 510, the method may include displaying a user interface including a communication session between a first user, a second user, and a chatbot. Each of the first user and the second user may connect to a host platform that hosts the communication session via respective devices. Here, the first user and the second user may use first and second devices to establish a network connection with the host platform. The chatbot may be a software program that is hosted by a host platform.

In 520, the method may include detecting a request submitted by the first user to the second user via the user interface. For example, the request may be a question about an object that is being offered for purchase by the second user via a website, mobile application, etc., that is also hosted by the host platform. The request may include a text message that is sent via the communication session and may include unstructured text content, numbers, icons, images, and the like.

In 530, the method may include determining, via a machine learning model, a response to the request based on a type of object associated with the communication session, and determining a confidence value of the determined response. The response may include a predicted response to the question that is asked by the first user. However, rather than respond automatically to the response, the host platform may determine whether the confidence value is above a predetermined threshold. In 540, the method may include outputting a message from the chatbot via the user interface which includes the determined response, in response to the confidence value of the determined response being above the predetermined threshold value.

For example, the outputting may include outputting the message from the chatbot via the user interface on both a first user device of the first user and a second user device of the second user (i.e., via instances of the user interface displayed by both the first and second users). If, however, the confidence value is below the predetermined threshold, the host platform may output the determined response as a suggested response to a user interface of only the second user when the confidence value is below the predetermined threshold value. As another example, if the confidence value is below a lower (second) predetermined threshold the method may further include stopping the determined response from being output to the user interface. In this case, the host platform may capture the response entered by the second user to the first user's request, and learn from the response. In particular, the machine learning algorithm may be retrained based on the response submitted by the second user.

In some embodiments, the method may further include detecting, via the machine learning model, a query that is included within text content of the request submitted by the first user. In some embodiments, the determining the response may include determining a response to the detected query via the machine learning model. In some embodiments, the method may further include modifying the machine learning model based on requests and responses submitted during the communication session.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EE- PROM"), registers, hard disk, a removable disk, a compact disk read-only memory ("CD-ROM"), or any other form of storage medium known in the art.

Figure 6:
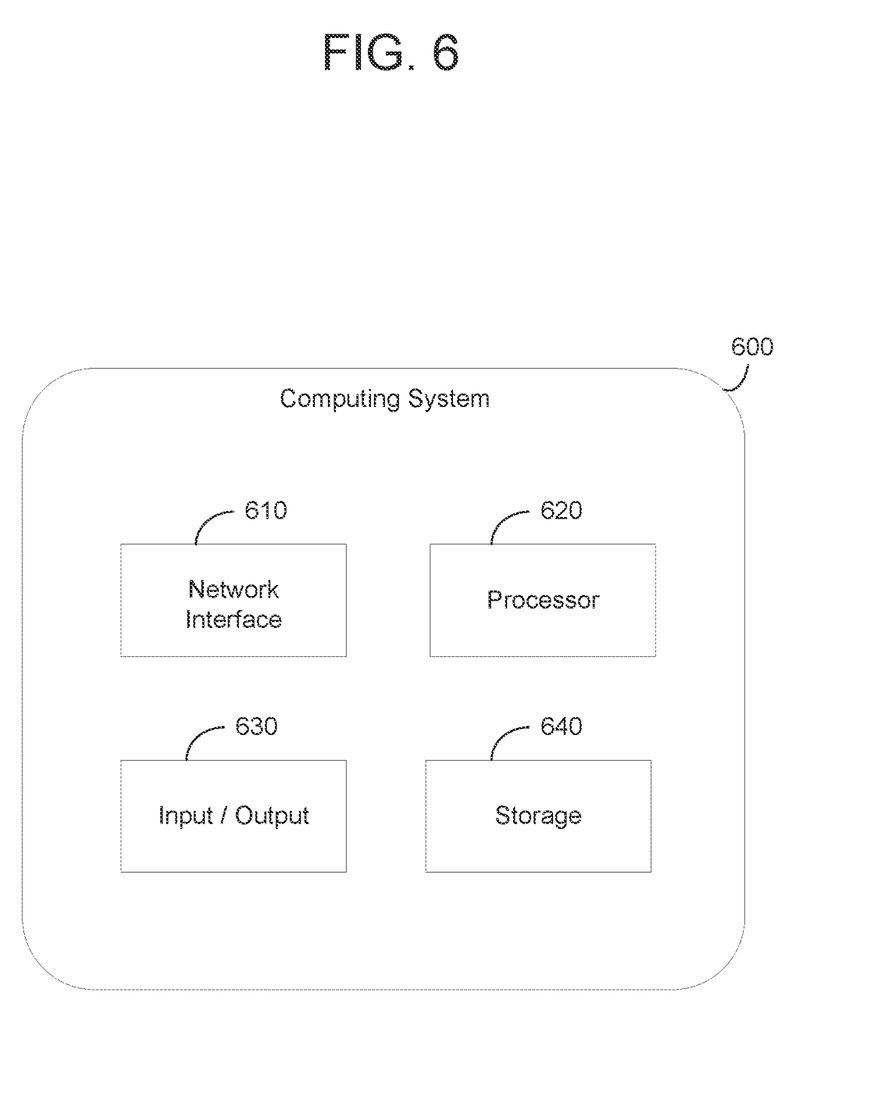
FIG. 6 is a diagram illustrating a computing system for performing the methods and processes of the example embodiments.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 6 illustrates an example computer system 600 which may represent or be integrated in any of the above-described components, etc. FIG. 6 is not intended to suggest any limitation as to the scope of use or functionality of embodiments of the application described herein. The computing system 600 is capable of being implemented and/or performing any of the functionality set forth hereinabove.

The computing system 600 may include a computer system/server, which is operational with numerous other general purpose or special purpose computing system environments or configurations. Examples of well-known computing systems, environments, and/or configurations that may be suitable for use as computing system 600 include, but are not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like. According to various embodiments described herein, the computing system 600 may be a web server.

The computing system 600 may be described in the general context of computer system-executable instructions, such as program modules, being executed by a computer system. Generally, program modules may include routines, programs, objects, components, logic, data structures, and so on that perform particular tasks or implement particular abstract data types. The computing system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computing system 600 is shown in the form of a general-purpose computing device. The components of computing system 600 may include, but are not limited to, a network interface 610, one or more processors or processing units 620, an input/output 630 which may include a port, an interface, etc., or other hardware, for inputting and/or outputting a data signal from/to another device such as a display, a printer, etc., and a storage device 640 which may include a system memory, or the like. Although not shown, the computing system 600 may also include a system bus that couples various system components including system memory to the processor 620. In some embodiments, the input/output 630 may also include a network interface.

The storage 640 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, storage device 640 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device 640 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 600 may also communicate with one or more external devices such as a keyboard, a pointing device, a display, etc.; one or more devices that enable a user to interact with computer system/server; and/or any devices (e.g., network card, modem, etc.) that enable computing system 600 to communicate with one or more other computing devices. Such communication can occur via I/O interfaces. Still yet, computing system 600 can communicate with one or more networks such as a local area network (LAN), a general wide area network (WAN), and/or a public network (e.g., the Internet) via network interface 610. As depicted, network interface 610 may also include a network adapter that communicates with the other components of computing system 600 via a bus. Although not shown, other hardware and/or software components could be used in conjunction with the computing system 600. Examples include, but are not limited to: microcode, device drivers, redundant processing units, external disk drive arrays, RAID systems, tape drives, and data archival storage systems, etc.

It will be readily understood that descriptions and examples herein, as generally described and illustrated in the figures, may be arranged and designed in a wide variety of different configurations. Thus, the detailed description of the embodiments is not intended to limit the scope of the application as claimed but is merely representative of selected embodiments of the application. One of ordinary skill in the art will readily understand that the above may be practiced with steps in a different order, and/or with hardware elements in configurations that are different than those which are disclosed. Therefore, although the application has been described based upon some preferred embodiments, it would be apparent to those of skill in the art that certain modifications, variations, and alternative constructions would be apparent.

What is claimed is:

1. A computing system comprising:
a processor configured to:
displaya user interface of a messaging application including a communication session between a first user, a second user, and a chatbot;
detect, via the user interface, a request message submitted by the first user to the second user via the user interface, wherein the request message comprises message content associated with an object;
identify and retrieve non-message content describing the object from an external source via a uniform resource locator (URL);
input the message content associated with the object and the non-message content describing the object to a machine learning model and determine, via execution of the machine learning model, a response message of the second user to the request message based on the input and calculate a confidence value of the determined response message;
decide whether to automatically output the determined response message of the second user via the chatbot based on a comparison of the calculated confidence value to a predefined confidence value threshold; and
output a message from the chatbot via the user interface which includes the determined response message, in response to a decision to automatically output the determined response of the second user.

2. The computing system of claim 1, wherein the processor is further configured to detect, via the machine learning model, a query that is included within text content of the request message submitted by the first user.

3. The computing system of claim 2, wherein the processor is configured to determine an answer of the second user to the detected query via the machine learning model and include the answer in the response message.

4. The computing system of claim 1, wherein the processor is configured to stop the determined response message from being output to the user interface via the chatbot in response to the confidence value being below the predefined confidence value threshold.

5. The computing system of claim 1, wherein the processor is configured to output the determined response message from the chatbot via instances of the user interface on both a first user device of the first user and a second user device of the second user.

6. The computing system of claim 1, wherein, in response to the confidence value of the determined response message of the second user being below the predefined confidence value threshold, the processor is further configured to output the determined response message from the chatbot to an instance of the user interface of the second user on a second user device but not an instance of the user interface of the first user on a first device, and output an option that allows the second user to select and send the determined response message via the communication session.

7. The computing system of claim 1, wherein the processor is further configured to retrain the machine learning model based on the request message submitted during the communication session and the determined response message predicted by the machine learning model and output by the chatbot.

8. The computing system of claim 1, wherein the processor is further configured to predict, via execution of the machine learning model, one or more recommended questions for the first user to ask the second user based on the request message, and in response, display the one or more recommended questions on an instance of the user interface of the first user device but not the second user device.

9. A method comprising:
displaying a user interface of a messaging application including a communication session between a first user, a second user, and a chatbot;
detecting, via a user interface, a request message submitted by the first user to the second user via the user interface, wherein the request message comprises message content associated with an object;
identifying and retrieve non-message content describing the object from an external source via a uniform resource locator (URL);
input the message content associated with the object and the non-message content describing the object to a machine learning model and determining, via execution of the machine learning model, a response message of the second user to the request message based on the input and calculating a confidence value of the determined response message;
deciding whether to automatically output the determined response message of the second user via the chatbot based on a comparison of the calculated confidence value to a predefined confidence value threshold; and
outputting a message from the chatbot via the user interface which includes the determined response message, in response to a decision to automatically output the determined response of the second user.

10. The method of claim 9, wherein the method further comprises detecting, via the machine learning model, a query that is included within text content of the request message submitted by the first user.

11. The method of claim 10, wherein the determining the response comprises determining an answer of the second user to the detected query via the machine learning model and including the answer in the response message.

12. The method of claim 9, wherein the method further comprises stopping the determined response message from being output to the user interface via the chatbot in response to the confidence value being below the predefined confidence value threshold.

13. The method of claim 9, wherein the outputting comprises outputting the determined response message from the chatbot via instances of the user interface on both a first user device of the first user and a second user device of the second user.

14. The method of claim 9, wherein in response to the confidence value of the determined response message of the second user being below the predefined confidence value threshold, the method further comprises outputting the determined response message from the chatbot to an instance of the user interface of the second user on a second user device but not an instance of the user interface of the first user on a first device, and output an option that allows the second user to select and send the determined response message via the communication session.

15. The method of claim 9, wherein the method further comprises retraining the machine learning model based on the request message submitted during the communication session and the determined response message predicted by the machine learning model and output by the chatbot.

16. A non-transitory computer-readable medium comprising instructions which when executed by a processor cause a computer to perform a method comprising:
displaying a user interface of a messaging application including a communication session between a first user, a second user, and a chatbot;

detecting, via a user interface, a request message submitted by the first user to the second user via the user interface, wherein the request message comprises message content associated with an object;

identifying and retrieve non-message content describing the object from an external source via a uniform resource locator (URL);

input the message content associated with the object and the non-message content describing the object to a machine learning model and determining, via execution of the machine learning model, a response message of the second user to the request message based on the input and calculating a confidence value of the determined response message;

deciding whether to automatically output the determined response message of the second user via the chatbot based on a comparison of the calculated confidence value to a predefined confidence value threshold; and outputting a message from the chatbot via the user interface which includes the determined response message, in response to a decision to automatically output the determined response of the second user.

17. The non-transitory computer-readable medium of claim 16, wherein the method further comprises detecting, via the machine learning model, a query that is included within text content of the request message submitted by the first user.

18. The non-transitory computer-readable medium of claim 17, wherein the determining the response comprises determining an answer of the second user to the detected query via the machine learning model and including the answer in the response message.

19. The non-transitory computer-readable medium of claim 16, wherein the method further comprises stopping the determined response message from being output to the user interface via the chatbot in response to the confidence value being below the predefined confidence value threshold.

20. The non-transitory computer-readable medium of claim 16, wherein the outputting comprises outputting the determined response message from the chatbot via instances of the user interface on both a first user device of the first user and a second user device of the second user.

21. The non-transitory computer-readable medium of claim 16, wherein in response to the confidence value of the determined response message of the second user being below the predefined confidence value threshold, the method further comprises outputting the determined response message from the chatbot to an instance of the user interface of the second user on a second user device but not an instance of the user interface of the first user on a first device, and output an option that allows the second user to select and send the determined response message via the communication session.

* * * * *